(12) United States Patent
Beazer et al.

(10) Patent No.: US 8,521,864 B1
(45) Date of Patent: Aug. 27, 2013

(54) SYSTEMS AND METHODS FOR MANAGING THE IMPACT OF MONITORING PROCESSES

(75) Inventors: Mark R. Beazer, Orem, UT (US); Thane T. Packer, Pleasant Grove, UT (US); Daniel T. Alger, South Salt Lake, UT (US)

(73) Assignee: Crimson Corporation, Dover, DE (US)

( * ) Notice: Subject to any disclaimer, the term of this patent is extended or adjusted under 35 U.S.C. 154(b) by 1464 days.

(21) Appl. No.: 11/328,731

(22) Filed: Jan. 10, 2006

(51) Int. Cl.
*G06F 15/173* (2006.01)
*G06F 15/16* (2006.01)
*G06F 9/46* (2006.01)
*G05B 15/02* (2006.01)

(52) U.S. Cl.
USPC ............. 709/224; 700/9; 709/202; 709/203; 709/206; 709/208; 709/228; 718/105; 718/106

(58) Field of Classification Search
USPC ............... 709/201–204, 206, 208, 223–224, 709/227–228; 700/1–3, 9; 718/100, 105–106
See application file for complete search history.

(56) References Cited

U.S. PATENT DOCUMENTS

| | | | |
|---|---|---|---|
| 6,212,581 B1 * | 4/2001 | Graf | 710/18 |
| 6,421,737 B1 * | 7/2002 | Stone et al. | 709/224 |
| 6,438,563 B1 * | 8/2002 | Kawagoe | 1/1 |
| 6,640,203 B2 | 10/2003 | Brown et al. | |
| 6,934,916 B1 | 8/2005 | Webb et al. | |
| 7,015,808 B1 | 3/2006 | Sattler et al. | |
| 7,076,779 B2 | 7/2006 | Breunese | |
| 7,103,847 B2 | 9/2006 | Alford, Jr. et al. | |
| 7,693,983 B1 * | 4/2010 | Gupta et al. | 709/224 |
| 2002/0078194 A1 * | 6/2002 | Neti et al. | 709/224 |
| 2005/0216585 A1 * | 9/2005 | Todorova et al. | 709/224 |
| 2007/0100987 A1 * | 5/2007 | Aggarwal et al. | 709/224 |

\* cited by examiner

*Primary Examiner* — Ashok Patel
*Assistant Examiner* — Kevin Bechtel
(74) *Attorney, Agent, or Firm* — Austin Rapp & Hardman

(57) ABSTRACT

An exemplary method involves receiving a request to monitor a resource within a computer system. The request may be a monitoring resource request or a configuration request. A plurality of requests may be received and collected in a collector. The method also involves selecting a monitoring process from a plurality of monitoring processes and forwarding the request to the selected monitoring process. The capabilities of each monitoring process within the plurality of monitoring processes are registered with the collector. The method further involves enabling the selected monitoring process to terminate after execution of the request.

14 Claims, 10 Drawing Sheets

SYSTEMS AND METHODS FOR MANAGING THE IMPACT OF MONITORING PROCESSES

TECHNICAL FIELD

The present invention relates generally to computers and computer-related technology. More specifically, the present invention relates to systems and methods for forwarding a monitoring request and managing the impact of monitoring processes executing the request.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Monitoring the efficiency of computer systems is important to anyone who relies on computers. Whether a computer or computing device is in a home or a business, it is important that the computer system operates at maximum efficiency. Monitoring requests may be sent to monitoring processes to monitor various hardware components or software programs running on the computer system. For example, a monitoring request may request an efficiency report about the hard drive of the computer system. A monitoring request may also request the amount of available disk space available on the computer system. Many other kinds of monitoring requests may include a request to monitor various aspects of computer systems.

Typically, current monitoring processes function in a monolithic environment. For example, when a single monitoring process monitors a hardware component or software program, the other monitoring processes are also active and monitor their respective hardware component or software program. When the single monitoring process completes its monitoring request, the other monitoring processes also terminate their requests. As shown by the foregoing example, generally current monitoring processes monitor all the hardware components and software programs or none at all.

Each active monitoring process increases the load on the computer system. With each load increase, the efficiency of the computer system may decrease. Under the monolithic environment of current monitoring processes, the load is increased on computer systems because unnecessary monitoring processes are constantly monitoring hardware components or software programs each time monitoring requests are deployed. As the demand for more efficient computer systems constantly increases, the desire to minimize the load on the computer system by only activating the necessary monitoring processes is also increased.

Unfortunately, known systems and methods for monitoring hardware components and software within a computer system suffer from various drawbacks. Accordingly, benefits may be realized by improved systems and methods for monitoring processes within computer systems. Some exemplary systems and methods for monitoring processes are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
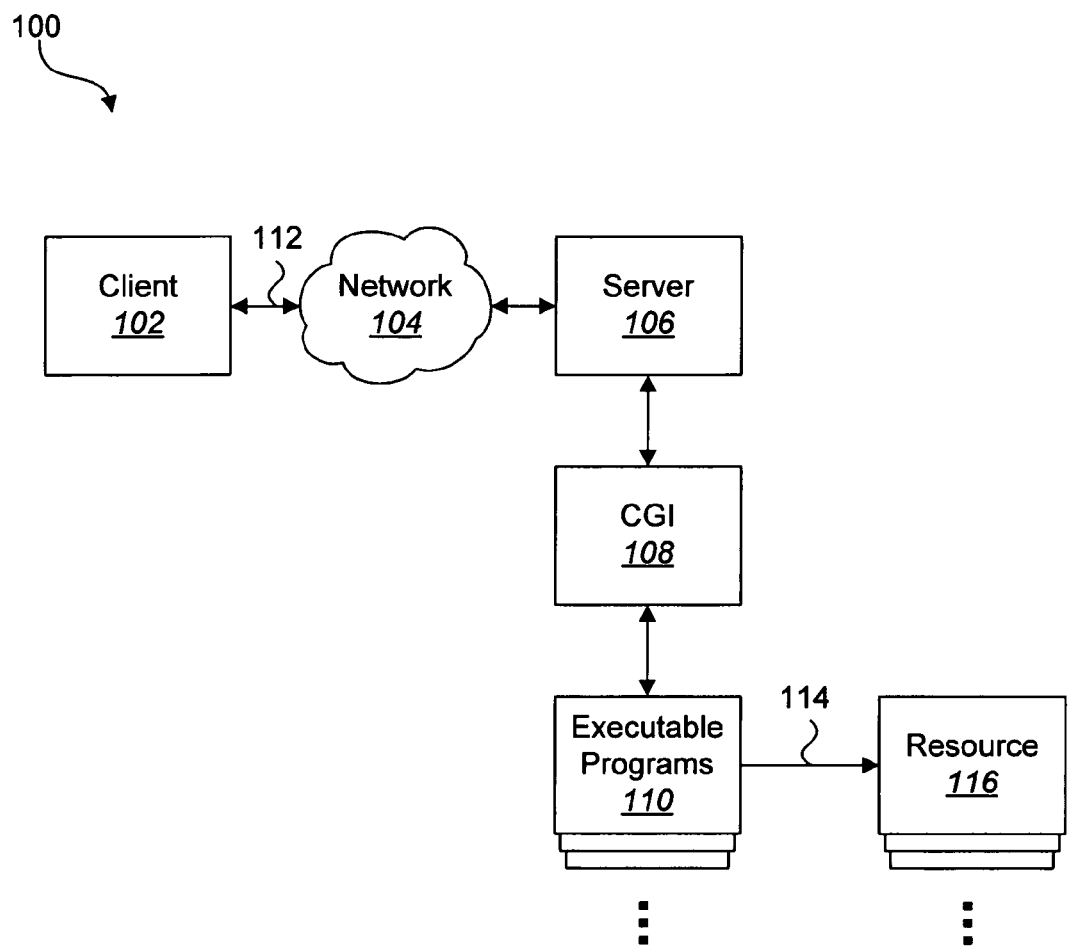
FIG. 1 is an exemplary network block diagram of a system using a common gateway interface.

A method for monitoring resources within a computer system is disclosed. A request is received from a computing device via a computer network requesting that at least one resource in the computer system be monitored. A monitoring process is selected from a plurality of monitoring processes that is capable of monitoring the at least one resource. The request is forwarded to the selected monitoring process within the plurality of monitoring processes. Resource information is obtained about the at least one resource by the selected monitoring process. The resource information about the at least one resource is sent to the computing device that sent the request. The selected monitoring process has the ability to terminate after execution of the request.

In one embodiment, a collector collects a plurality of requests. Capabilities of each monitoring process within the plurality of monitoring processes may be registered with the collector. Furthermore, the capabilities of each monitoring process may be stored within the collector. In some embodiments there may be one or more secondary collectors. A request may be communicated to a secondary collector.

A command to terminate the monitoring process may be sent from a remote location.

Various communications ports may be used. For example, a fixed communications port may be monitored. Additionally, a plurality of dynamic communications ports may also be monitored.

A computer system that is configured to implement a method for monitoring resources is also disclosed. The computer system includes a processor and memory in electronic communication with the processor. Instructions are stored in the memory and are executable to implement the method. A request is received. A monitoring process is selected from a plurality of monitoring processes. The request is forwarded to the selected monitoring process within the plurality of monitoring processes. The selected monitoring process is able to terminate after execution of the request.

A collector may be configured to select the monitoring process from the plurality of monitoring processes. The collector may further be configured to send a command to terminate the monitoring process after execution of the request.

A connection table may be used to provide capabilities of each monitoring process within the plurality of monitoring processes to a collector.

A secure interface may receive the request from a client. A common gateway interface may communicate the request from the secure interface to the collector.

A monitoring table may provide information regarding which monitoring process within the plurality of monitoring processes is monitoring a particular resource.

A computer-readable medium comprising executable instructions for implementing a method for monitoring resources within a computer system is also disclosed. Capabilities of each monitoring process within a plurality of monitoring processes are registered with a collector. The capabilities of each monitoring process are stored within the collector. A plurality of requests is received. The plurality of requests is collected within the collector. The monitoring process is selected from the plurality of monitoring processes. The request is forwarded to the selected monitoring process within the plurality of monitoring processes. The selected monitoring process is able to terminate after execution of the request.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a network block diagram of a system 100 utilizing a common gateway interface 108. Although FIG. 1 illustrates a client-server system, a peer to peer based system may also be used to implement the present systems and methods. The common gateway interface 108 is a standard for interfacing a plurality of executable programs 110 with an information server 106. In one embodiment, the common gateway interface 108 includes a computer program. Each executable program, within the plurality of executable programs 110, is executed dynamically so that it may output dynamic information. The plurality of executable programs 110 may consist of computer programs written in computer languages such as C/C++, Fortran, PERL, TCL, Visual Basic, AppleScript, and the like.

FIG. 1 also illustrates a client 102 in electronic communication with a network 104. The client 102 may include a personal computer, laptop, PDA, and the like. The network 104 depicted in FIG. 1 may be embodied in a wide variety of configurations and may include, for example, a combination of multiple networks. The network 104 may include, for example, a local area network (LAN), storage area networks (SANs), metropolitan area networks (MANs), wide area networks (WANs), and combinations thereof (e.g., the Internet). A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

The server 106 is also in electronic communication with the network 104. The server 106 may include an HTTP or Web server. In one embodiment, the client 102 communicates a request to the server 106 across the network 104. The request may include a request to monitor a resource 116 within a computer system (not shown). The resource 116 may include the available disk space of the system, the CPU usage, and the like. The request may be sent from the client 102 to the server 106 across a network connection 112. In one embodiment, the request is transmitted to the server 106 via HTTP communications. In many contexts, the server 106 cannot process the request. An executable program within the plurality of executable programs 110 is required to process the request sent by the client 102. The common gateway interface 108 facilitates forwarding the request from the server 106 to an executable program within the plurality of executable programs 110. The executable program executes the request and monitors 114 the resource 116. The common gateway interface 108 facilitates returning the results of the request from the executable program to the server 106. The server 106 may then communicate the results of the request to the client 102 through the network 104.

Figure 2:
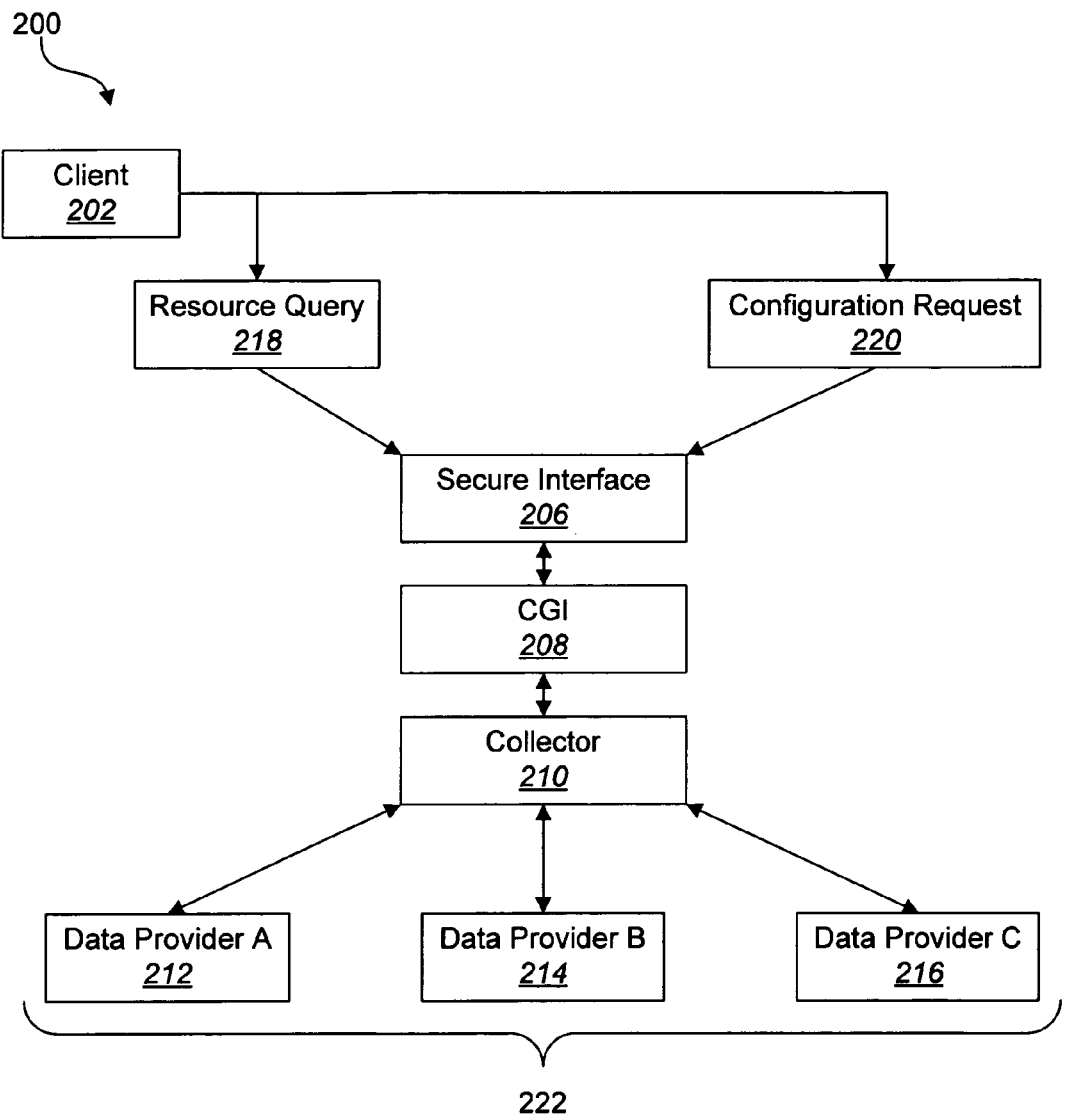
FIG. 2 is one embodiment of a monitoring system.

FIG. 2 illustrates one embodiment of a monitoring system 200. The system 200 allows a client 202 to send a monitoring request, such as a resource query 218 or a configuration request 220, to a monitoring process. The resource query 218 may be a monitorable resource query to enumerate the types and instances of resources that are available for monitoring. For example, a type of monitoring might include "Disk Space," and a possible instance of this monitor may include the "C Drive." The configuration request 220 may be a request to modify the parameters of the resource query 218. The client 202 may communicate other types of requests, in addition to the resource query 218 and the configuration request 220. For example, the client 202 may send a request to obtain information regarding the monitoring state, thresholds, and current status for each monitorable resource as explained in relation to FIG. 6. The client 202 may also send a request to retrieve historical data about each monitorable resource. Further, the client 202 may send a request to initiate a real time feed of data about each monitorable resource.

In one embodiment, the client 202 communicates the request to the secure interface 206. The secure interface 206 may include an HTTP or Web server as described in FIG. 1. The secure interface 206 facilitates communicating the request, such as the resource query 218 and the configuration request 220, to a collector 210 through a common gateway interface 208. The collector 210 manages the various requests that are sent from the secure interface 206 through the common gateway interface 208. In one embodiment, the secure interface 206 launches the common gateway interface 208 and communicates the request to the common gateway interface 208. The common gateway interface 208 forwards the request to the collector 210. Once the collector 210 receives the request, the common gateway interface 208 may shut down. In one embodiment, the collector 210 monitors a fixed communication port (not shown) for requests sent from the secure interface 206 through the common gateway interface 208.

After the collector 210 receives the request, the collector 210 forwards the request to a data provider within a plurality of data providers 222. Data providers A 212, B 214 and C 216 are processes or programs that provide monitoring information for one or more resources. When multiple monitoring requests are deployed, each request may be forwarded to various monitoring processes or programs. Forwarding each request to a different monitoring process or program allows multiple requests to be executed during the same time period. The efficiency of numerous hardware components or software programs running on the computer system may be obtained and the overall efficiency of the computer system may be determined.

In one embodiment, data providers A 212, B 214 and C 216 provide monitoring information regarding the hardware components or software programs running on a particular system. The data providers 212, 214, 216 monitor a dynamic communications port (not shown) or a range of dynamic communications ports for requests sent from the collector 210. For example, the collector 210 may, after receiving a request to monitor a resource from the common gateway interface 208, forward this request to data provider A 212. Once data provider A 212 has executed the request, data provider A 212 sends the results to the collector 210, and it 212 may choose to shut down in order to reduce the overall load on the monitoring system 200. Data provider A 212 may shut down while data provider B 214 and data provider C 216 continue to execute other requests sent from the collector 210. In this regard, data provider A 212 is only active and monitoring a resource while it is executing the request and providing monitoring information to the collector 210.

Figure 3:
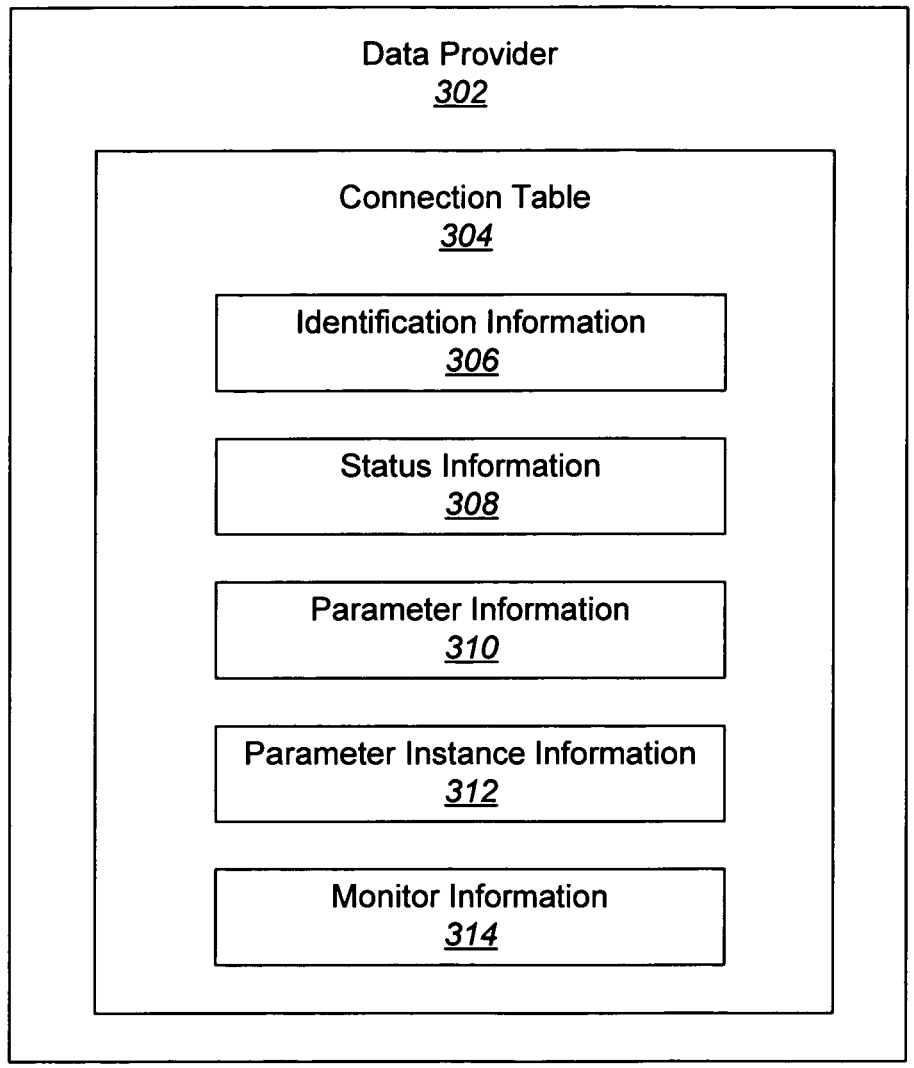
FIG. 3 illustrates one embodiment of a monitoring process.

FIG. 3 is a block diagram illustrating one embodiment of a data provider 302 that includes a connection table 304. The connection table 304 provides information regarding the functionality and capabilities of the data provider 302 such as identification information 306, status information 308, parameter information 310, parameter instance information 312, and monitor information 314. While only the single data provider 302 is illustrated in FIG. 3, each data provider 212, 214, 216, 302 within the monitoring system 200 may include a connection table 304. Each connection table provides information pertaining to the functionality and capabilities of each particular data provider.

The identification information 306 includes information that identifies the data provider 302 from within the plurality of data providers 222. For example, the identification information 306 may include a unique name identifying the data provider 302. The identification information 306 may also include the dynamic communications port, or range of dynamic communications ports, that the data provider 302 monitors for requests sent from the collector 210.

The status information 308 includes information regarding the active or inactive state of the data provider 302. For example, if the data provider 302 is running and providing monitoring information for a particular resource within a system, the status information 308 may include an "active state." If the data provider 302 is not running, and thus not monitoring a resource, the status information 308 includes an "inactive state." The status information 308 is updated as the status of the data provider 302 changes. For example, after the data provider 302 executes a monitoring request and sends the results back to the collector 210, the data provider 302 may shut down. The status information 308 changes from an "active state" to an "inactive state."

The parameter information 310 includes information regarding the types of monitoring resources the data provider 302 is capable of monitoring. For example, the parameter information 310 may include "disk space" or "CPU usage" to indicate that the data provider 302 is capable of monitoring these types of resources. Similarly, the parameter instance information 312 provides information relating to the specific instance of the resource the data provider 302 is capable of monitoring. For example, the parameter information 310 may include "disk space" and the parameter instance information 312 may include "C Drive." In this example, the data provider 302 is capable of providing monitoring information regarding the disk space of the C drive of a system. In addition to the CPU usage and disk space usage examples, the data provider 302 is capable of monitoring other resources including, but not limited to disk usage, disk insertion, disk removal, disk replacement, disk failures, file creation, file deletion, file replacement, file usage, CPU usage, CPU current speed, CPU insertion, CPU removal, CPU replacement, chassis intrusion sensors, temperature sensors, fan speed sensors, voltage sensors, USB device insertion, USB device removal, USB device replacement, modem insertion, modem removal, modem replacement, modem usage, memory usage, memory errors, memory insertion, memory removal, memory replacement, virtual memory usage, OS performance, OS events, OS logs, OS updates, OS modifications, application program installation, application program removal, application program replacement, application program launch, application program terminate, application program performance, software licenses, printers, printing, OS service install, OS service remove, OS service replace, OS service launch, OS service terminate, network interface insertion, network interface removal, network interface replacement, network interface performance, user login, user logout, user creation and user deletion.

The connection table 304 further includes the monitor information 314 which provides information regarding the resource the data provider 302 is monitoring. The monitor information 314 includes the results of the request sent from the collector 210. Further, the monitor information 314 is updated each time the data provider 302 monitors the resource. After the data provider 302 monitors the resource and the monitor information 314 is updated with the results of the request, the data provider 302 communicates the monitor information 314 to the collector 210. The data provider 302 may then shut down and discontinue monitoring the resource in order to reduce the load on the monitoring system 200.

Figure 4:
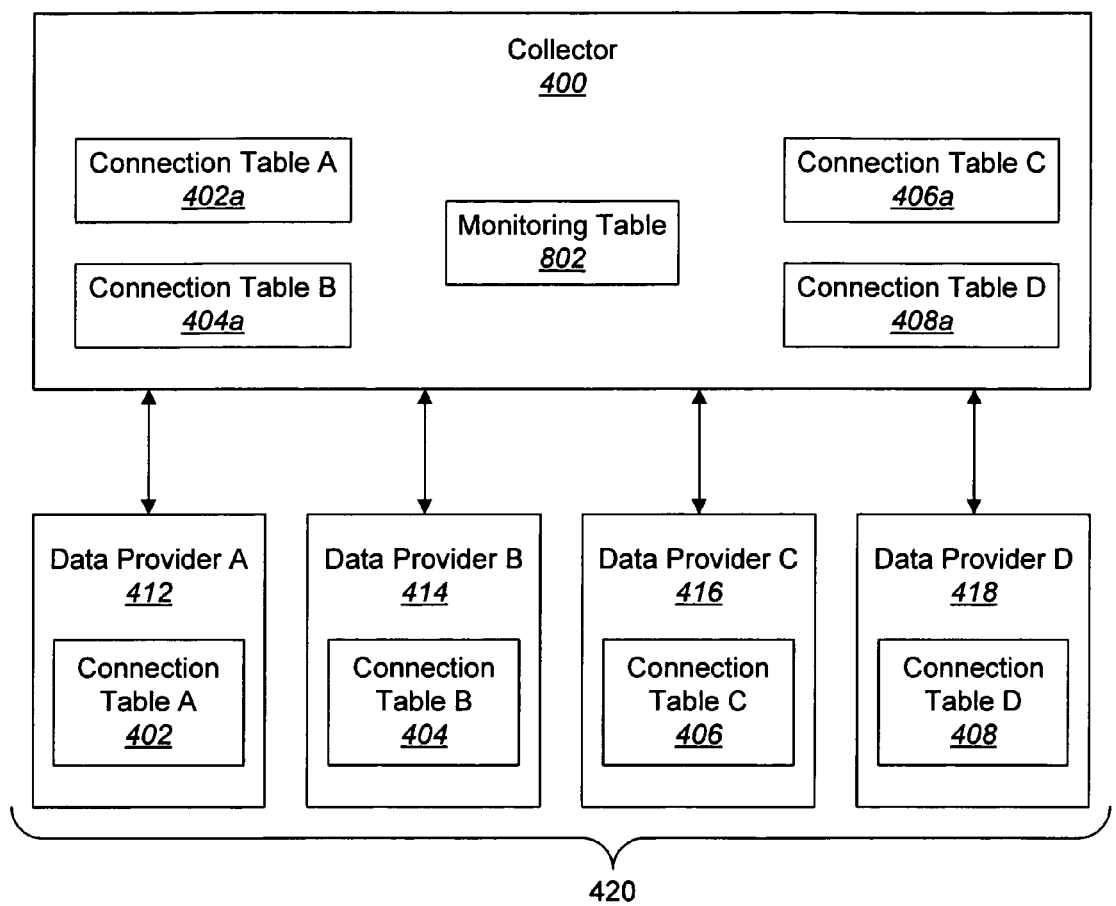
FIG. 4 illustrates one embodiment of a collector.

FIG. 4 is a block diagram illustrating one embodiment of a collector 400. The collector 400 manages various requests and communicates each request to a specific data provider within a plurality of data providers 420. Each data provider within the plurality 420 of data providers maintains a connection table that includes information unique to that data provider. For example, data provider A 412 maintains connection table A 402. Data provider B 414 maintains connection table B 404. Data provider C 416 maintains connection table C 406, and data provider D 418 maintains connection table D 408.

The collector 400 communicates with each data provider within the plurality of data providers 420 to obtain the information provided in each connection table 402, 404, 406, 408. The collector 400 stores a copy of each connection table 402, 404, 406, and 408. For example, the collector 400 communicates with data provider A 412. Data provider A 412 publishes the information within connection table A 402 to the collector 400: namely the identification information 306, the status information 308, the parameter information 310, the parameter instance information 312, and the monitor information 314. The collector 400 stores a copy of connection table A 402a and the corresponding information. Similarly, the collector 400 stores copies of connection tables B 404a, C 406a and D 408a and their corresponding information. In one embodiment, the collector 400 maintains a cache of each connection table 402a, 404a, 406a, 408a.

When the information is updated within the connection table 304 maintained by the data provider 302, the information is similarly updated in the copy of the connection table 304 stored by the collector 400. For example, if data provider A 412 shuts down, the status information 308 within connection table A 402 is changed from an "active state" to an "inactive state." Data provider A 412 publishes connection table A 402 with the updated status information 308 to the collector 400 immediately before shutting down. The collector 400 replaces the previous version of connection table A 402a stored within the collector 400 with an updated connection table A 402a that includes the status information 308 of an "inactive state." As depicted, the collector 400 also includes a monitoring table 802 which will be discussed in relation to FIG. 8.

Figure 5:
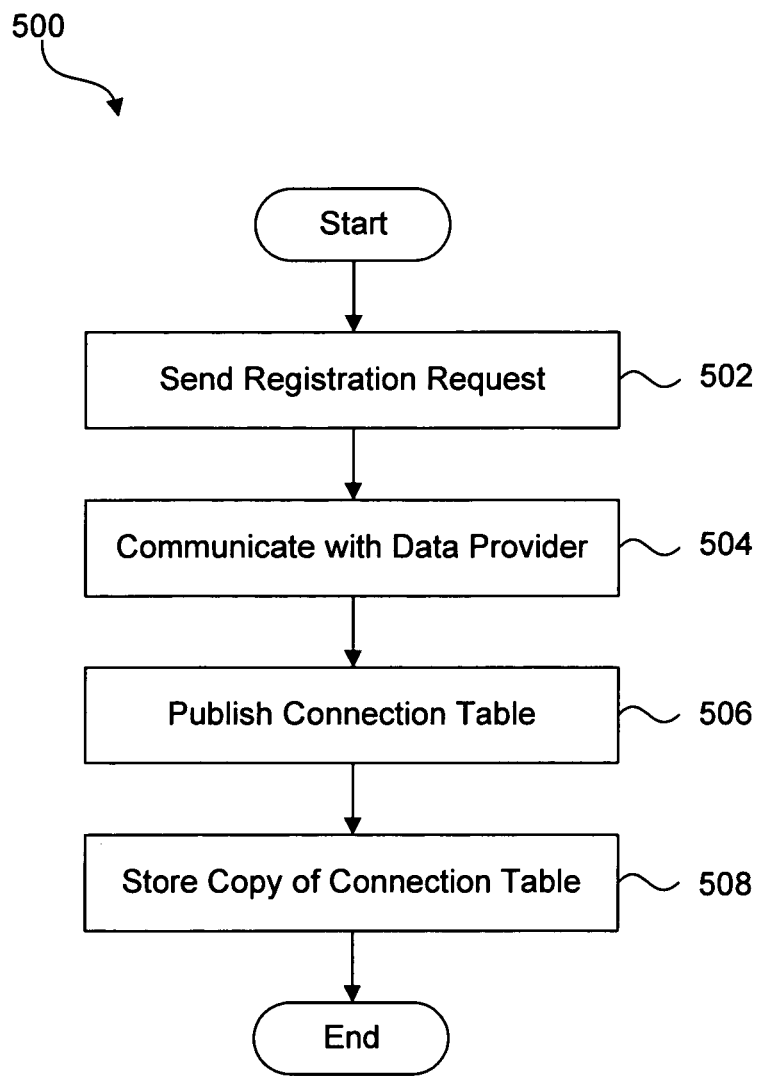
FIG. 5 is a flow chart illustrating one embodiment of a registration method.

FIG. 5 is a flow chart illustrating an embodiment of a registration method 500 of the data provider 302 with the collector 400. The registration method 500 enables the data provider 302 and its corresponding connection table 304 to be registered with the collector 400. The method 500 starts and the data provider 302 sends 502 a registration request to the collector 400. In one embodiment, the registration request includes the dynamic communication ports, or range of dynamic communications ports the data provider 302 is monitoring. The collector 400 communicates 504 with the data provider 302 through one of the dynamic communication ports provided within the registration request.

Once communication between the data provider 302 and the collector 400 has been established, the data provider 302 publishes 506 the connection table 304 and corresponding information to the collector 400. In a further embodiment, the collector 400 accesses the information within the connection table 304. Publishing 506 the information within the connection table 304 to the collector 400 allows the collector 400 to store a copy of the connection table 304 and to become aware of the functionality and capabilities of the data provider 302. For example, the collector 400 becomes aware of the unique identification of the data provider 302 through the identification information 306. The collector 400 also becomes aware of the current status of the data provider 302 through the status information 308. Further, the collector 400 is aware of which types of resources and instances the data provider 302 is capable of monitoring through the parameter information 310 and the parameter instance information 312. After the connection table 304 is published 506 to the collector 400, the collector 400 stores 508 a copy of the connection table 304.

Figure 6:
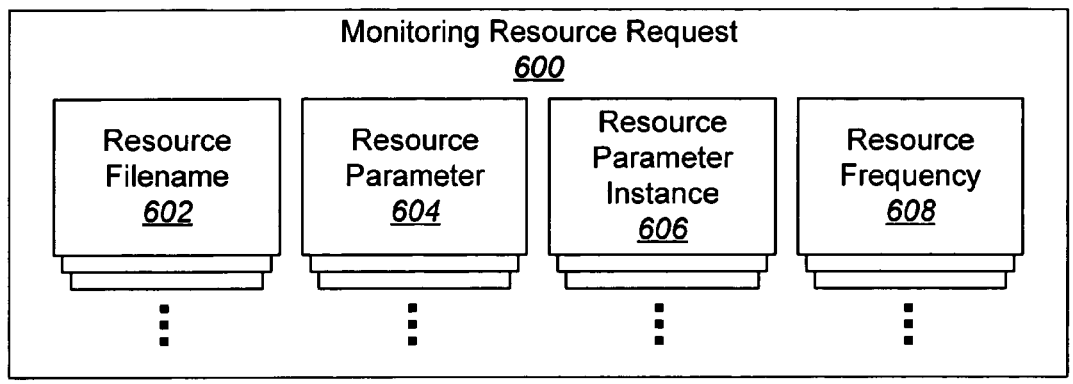
FIG. 6 illustrates one embodiment of a monitoring resource request.

FIG. 6 is a block diagram illustrating one embodiment of a monitoring resource request 600. The monitoring resource request 600 provides the parameters of a resource that is requested to be monitored. The parameters may include the type and instance of the resource as provided by the resource query 218 as explained in FIG. 2. The request 600 includes a resource filename 602, a resource parameter 604, a resource parameter instance 606, and a resource frequency 608. The resource filename 602 includes the name of the executable program that is to be executed in order to monitor the resource. For example, the resource filename 602 may include "monitorDS.exe" which may represent an executable program to monitor disk space of a system. The resource parameter 604 includes the type of resource that is requested to be monitored. For example, the resource parameter 604 may include "Disk Space." The resource parameter instance 606 indicates the instance of the resource parameter 604 that is requested to be monitored. For example, the resource parameter instance 606 may include "C Drive." The resource frequency 608 indicates how often the executable program indicated by the resource filename 602 is to be executed. For example, if the resource frequency 608 indicates "30 minutes," the executable program, "monitorDS.exe" is executed every 30 minutes. As illustrated, multiple resource filenames 602 and the associated resource parameter 604, resource parameter instance 606, and resource frequency 608 may be included in a single monitoring resource request 600.

Figure 7:
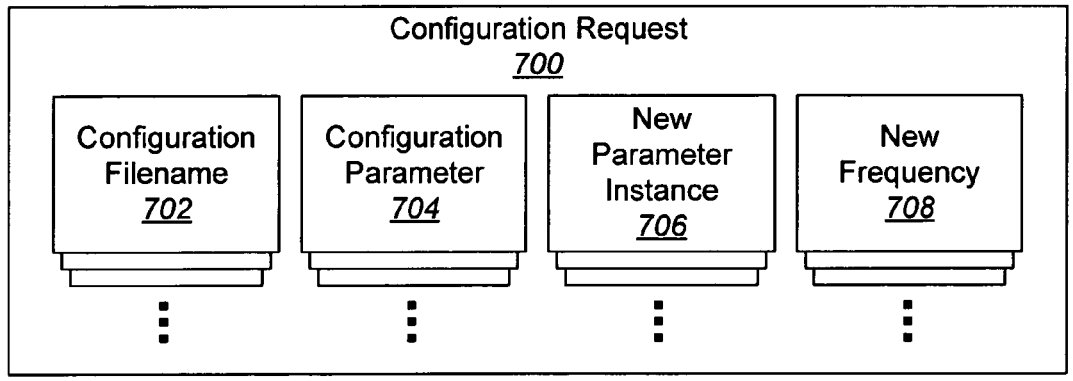
FIG. 7 illustrates one embodiment of a configuration request.

FIG. 7 is a block diagram illustrating one embodiment of a configuration request 700. The configuration request 700 facilitates modifying the parameters of the resource request 600, such as the type and instance of the resource to be monitored. The configuration request 700 includes a configuration filename 702. The request 700 also includes a configuration parameter 704, a new parameter instance 706, and a new frequency 708. The configuration filename 702 includes the name of the executable program that had been previously included in the monitoring resource request 600. For example, the configuration filename 702 may include "monitorDS.exe." The configuration parameter 704 includes the type of resource that is requested to be monitored. The configuration parameter 704 includes the parameter that had been previously included in the monitoring resource query request 600. For example, the configuration parameter 704 may include "Disk Space." The new parameter instance 706 indicates the new instance of the configuration parameter 704 that is requested to be monitored. The new parameter instance 706 may contain a different instance than the parameter instance 606 previously included in the monitoring resource request 600. For example, the new parameter instance 706 may indicate "D Drive." The new frequency 708 indicates how often the executable program indicated by the configuration filename 702 is to be executed. Similarly, the new frequency 708 may include a different frequency parameter than that contained in the monitoring resource request 600. For example, the new frequency 708 may indicate "15 minutes." Thus, according to the above example, the configuration request 700 modifies the parameters of the resource request 600 by modifying the resource parameter instance 606 and the resource frequency 608. As depicted, multiple resource queries 600 may be updated with a single configuration request 700. Multiple configuration filenames 702 and their associated configuration parameter 704, new parameter instance 706, and new frequency 708 may be included in a single configuration request 700.

Figure 8:
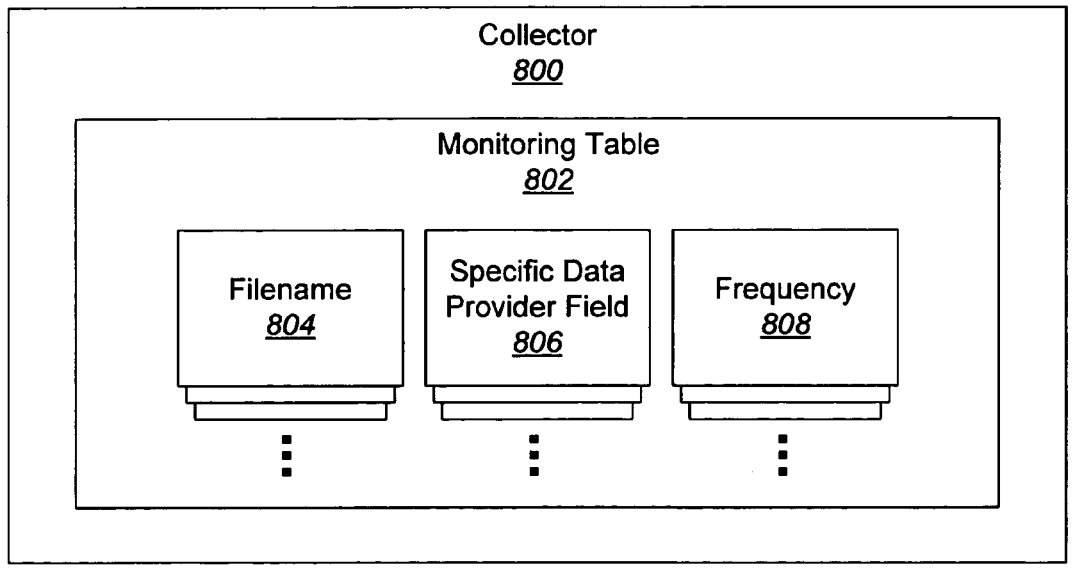
FIG. 8 illustrates a further embodiment of the collector.

FIG. 8 is a block diagram illustrating one embodiment of a collector 800 including a monitoring table 802. The monitoring table 802 provides information to the collector 800 regarding which data provider within a plurality 420 of data providers is monitoring a certain resource. The monitoring table 802 includes a filename 804, a specific data provider field 806, and a frequency 808. The filename 804 indicates the name of the executable program that was provided by the monitoring resource request 600 or the configuration request 700. For example, the filename 804 may include "monitorDS.exe." The specific data provider field 806 indicates which data provider within the plurality 420 of data providers is executing the program indicated by the filename 804. The specific data provider field 806 may include information from the identification information 306 within the connection table 304. For example, the specific data provider field 806 may include the unique name of the data provider 302 such as "Data Provider A." Alternatively, the specific data provider field 806 may include the dynamic communications port or range of dynamic communications ports that the data provider 302 monitors. The frequency 808 indicates how often the data provider 302 identified by the specific data provider field 806 executes the program provided by the filename 804. The frequency 808 is provided by the monitoring resource request 600 or the configuration request 700.

Figure 9:
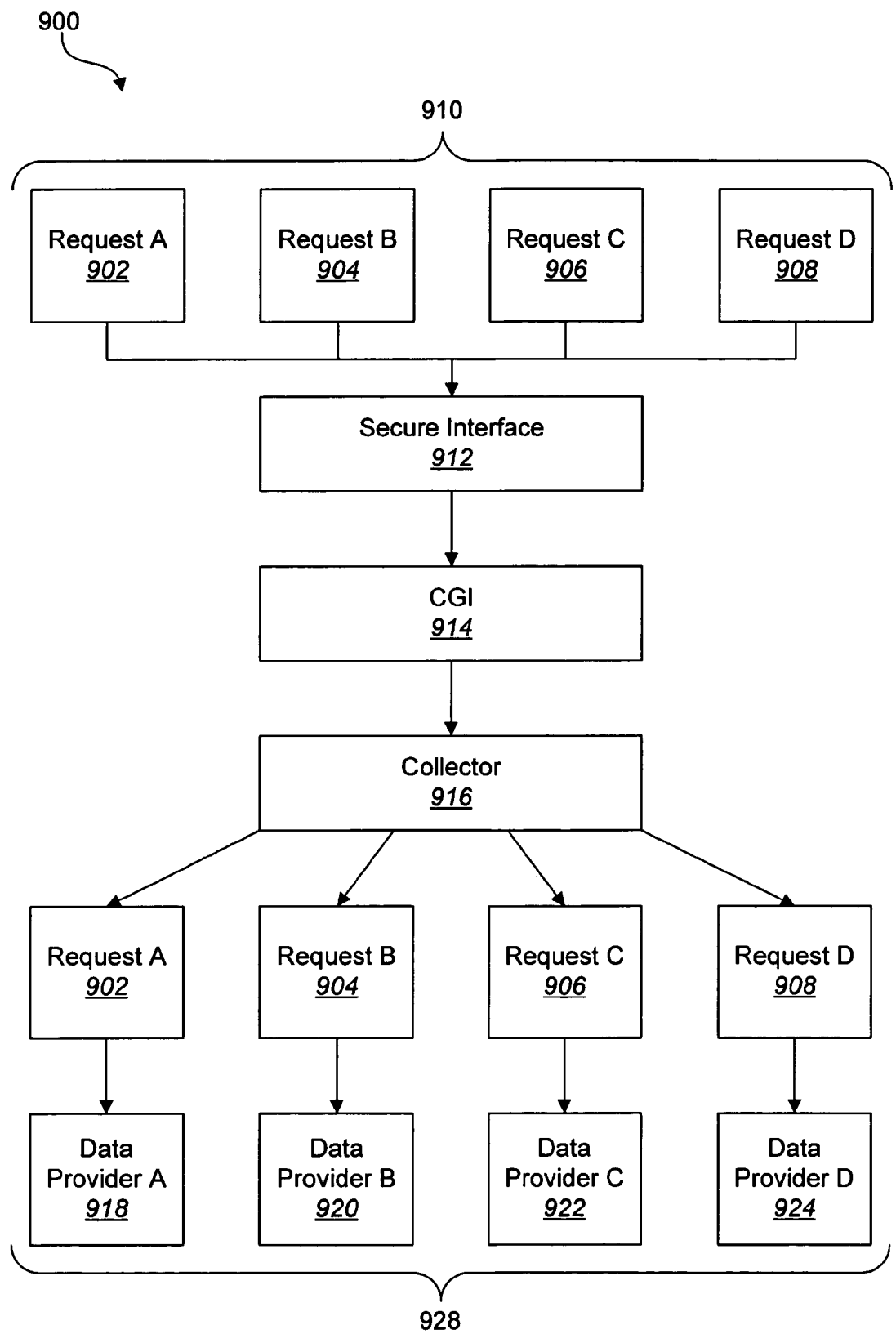
FIG. 9 is one embodiment of a monitoring request system.

FIG. 9 is a block diagram illustrating one embodiment of a monitoring request system 900 in relation with the monitoring system 200 discussed in FIG. 2. The system 900 includes a plurality 910 of requests. The plurality 910 of requests includes monitoring resource requests 600 or configuration requests 700 as discussed in relation to FIGS. 6 and 7 respectively. The plurality 910 as depicted in FIG. 9 includes individual requests such as request A 902, request B 904, request C 906, and request D 908. The plurality 910 of requests is communicated from a client (not shown) to a secure interface 912. The secure interface 912 may include an HTTP server or any other type of web server. The secure interface 912 provides a secure interface between a client and a collector 916.

The secure interface 912 launches a common gateway interface 914 and forwards the plurality 910 of requests to the common gateway interface 914. The common gateway interface 914 provides a common interface between the secure interface 912 and the collector 916. The common gateway interface 914 communicates the plurality 910 of requests to the collector 916. The collector 916 determines which data provider among a plurality 928 of data providers possesses the functionality and capability to handle each individual request 902, 904, 906, 908. As depicted, the plurality 928 of data providers includes data provider A 918, data provider B 920, data provider C 922, and data provider D 924. Each individual data provider 918, 920, 922, 924 is similar in function to the data provider 302 described in relation to FIG. 3. The collector 916 may determine that request A 902 is to be handled by data provider A 918, request B 904 is to be handled by data provider B 920, request C 906 is to be handled by data provider C 922, and request D 908 is to be handled by data provider D 924. After assigning each request 902, 904, 906, 908 to a specific data provider 918, 920, 922, 924, the collector 916 forwards each request 902, 904, 906, 908 to the appropriate data provider 918, 920, 922, 924.

Each individual data provider 918, 920, 922, 924 receives and executes the associated request 902, 904, 906, 908 transmitted from the collector 916. Each data provider 918, 920, 922, 924 communicates the results of the executed request 902, 904, 906, 908 back to the collector 916. After the data provider communicates the results of the request back to the collector 916, the individual data provider may choose to shut down in order to reduce the load on the monitoring system 900. For example, data provider A 918 may choose to shut down while the remaining data providers 920, 922, 924 continue to remain active and monitor a particular resource.

Figure 10:
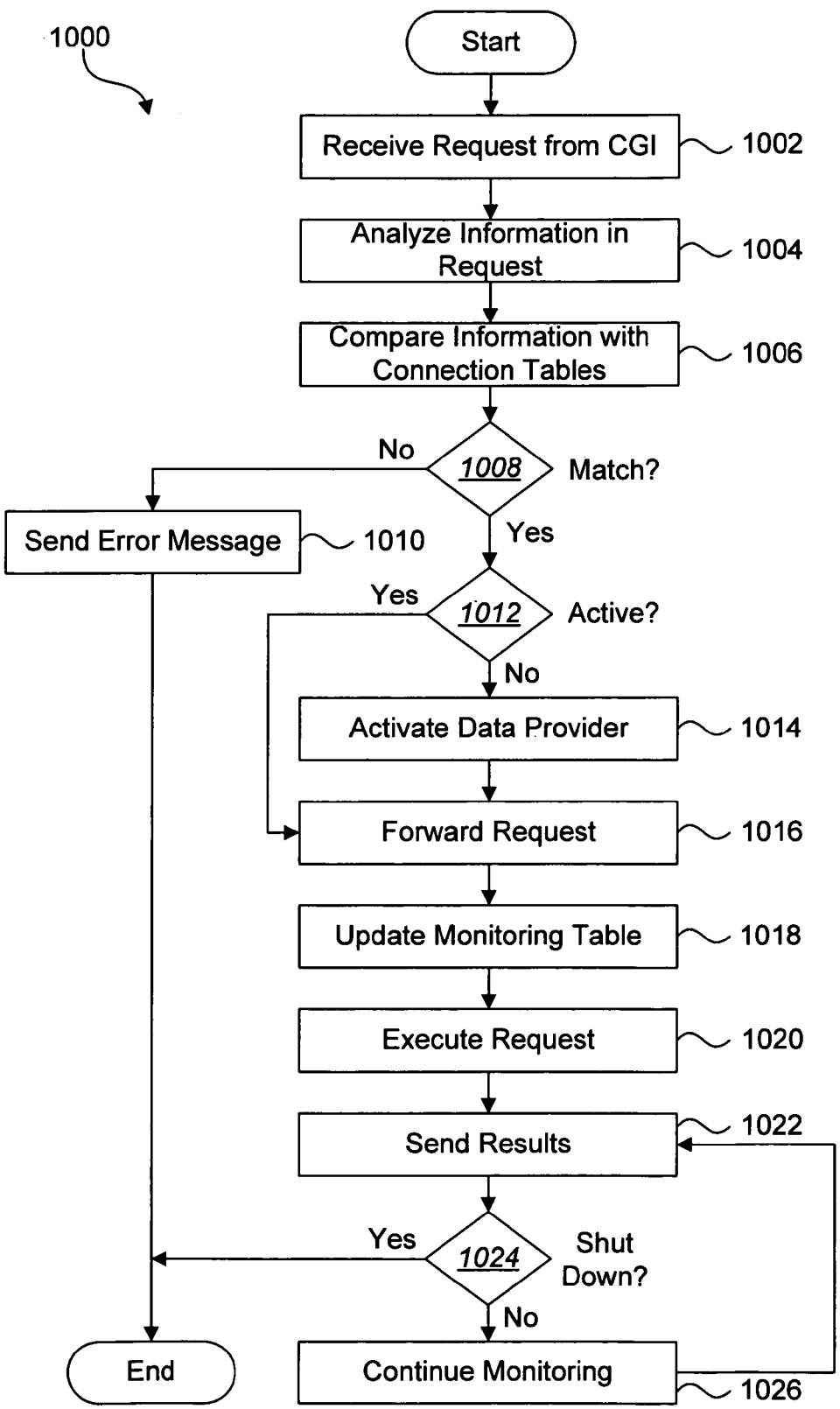
FIG. 10 is a flow chart illustrating one embodiment of a monitoring method.

FIG. 10 is a flow chart illustrating one embodiment of a monitoring method 1000. The method 1000 is used in conjunction with the monitoring system 900 as described in FIG. 9. The method 1000 enables the collector 916 to determine which data provider within the plurality of data provides 928 possesses the functionality and capability to handle a certain request.

The method 1000 starts and the collector 916 receives 1002 a request from the common gateway interface 914. In one embodiment, the request is a monitoring resource request 600 or a configuration request 700 as described in relation with FIGS. 6 and 7 respectively. The collector 916 analyzes 1004 the information included in the request. For example, if the request is a monitoring resource request 600, the information includes a resource filename 602, resource parameter 604, resource parameter instance 606, and a resource frequency 608 as described in FIG. 6. The method 1000 continues and the collector 916 compares 1006 the information included in the request with the information included in each individual connection table 304 that has been copied and stored within the collector 916. In one embodiment, the collector 916 compares the resource parameter 604 and the resource parameter instance 606 of the request 600 with the parameter information 310 and parameter instance information 312 included in each individual connection table 304. If no match 1008 is made between the resource parameter 604 and the parameter information 310 or the resource parameter instance 606 and the parameter instance information 312, the collector 916 sends 1010 an error message to the common gateway interface 914. If a match 1008 is made between the resource parameter 604 and the parameter information 310 and the resource parameter instance 606 and the parameter instance information 312, the collector 916 determines which data provider within the plurality of data providers 928 possesses the functionality and capability of handling the request. For example, if the resource parameter 604 of the request 600 indicates "Disk Space" and the resource parameter instance 606 indicates "C Drive," and the parameter information 310 of the stored copy of the connection table A 402 indicates "Disk Space" and the parameter information 312 of stored copy of the connection table A indicates "C Drive," the collector 916 determines that the data provider A 412 possesses the functionality and capability of executing the request 600 to provide monitoring information regarding the disk space of the C Drive.

The method 1000 continues and the collector 916 determines 1012 if the assigned data provider is in an "active state." The collector 916 evaluates the status information 308 of the copied connection table stored on the collector 916. The status information 308 provides information regarding the status of the data provider as described in FIG. 3. If the status information 308 indicates that the data provider is in an "inactive state", the collector 916 activates 1014 the data provider. The collector 916 may activate 1014 the data provider by starting the related program or process. Once the data provider is in an "active state", the collector 916 forwards 1016 the request 600 to the data provider. In one embodiment, the collector 916 analyzes the identification information 306 within the copied connection table to determine which dynamic communications port or range of dynamic communications ports the data provider is monitoring to receive a request. The collector 916 forwards 1016 the request 600 to the data provider through one of the identified dynamic communication ports.

Once the collector 916 forwards 1016 the request 600, the collector 916 updates 1018 the stored monitoring table 802 as described in FIG. 8. Updating 1018 the monitoring table 802 provides information to the collector 916 concerning which data provider within the plurality of data providers 928 possesses the functionality and capabilities of executing a certain request. In one embodiment, the filename 804 is updated with the name of the executable program contained in the resource filename 602. For example, the filename 804 may be updated with the filename "monitorDS.exe." The collector 916 also updates 1018 the specific data provider field 806 with the unique identifier for the data provider that is included in the identification information 306 of the connection table. In one embodiment, the specific data provider field 806 is updated 1018 with the name of the data provider, such as "Data Provider A." The collector 916 also updates 1018 the frequency 808 of the monitoring table 802. The frequency field 808 provides information relating to how often the data provider 302 identified by the specific data provider field 806 executes the program identified by the filename 804. The frequency 808 is updated from the resource frequency 608 or the new frequency 708 provided by the monitoring request 600 or the configuration request 700.

After the data provider 302 receives the request 600, the data provider 302 executes 1020 the request 600. In one embodiment, executing 1020 the request 600 includes executing the program specified by the resource filename 602. Once the data provider 302 executes 1020 the request 600, the data provider 302 updates the monitor information 314 within the connection table 304 stored within the data provider 302. The monitor information 314 includes the results from the executed request. The method 1000 continues and the data provider 302 sends 1022 the results back to the collector 916. In one embodiment, the data provider 302 publishes the monitor information 314, which contains the results of the request 600, to the collector 916. For example, data provider A 402 may publish connection table A 412 with the updated monitor information 314 to the collector 916. The collector 916 receives the results and updates the copied connection table with the updated monitor information 314.

The data provider 302 may choose 1024 to shut down. In one embodiment, the data provider 302 shuts down if the load on the monitoring system 900 will be reduced. In another embodiment, the data provider 302 may shut down according to a command sent from the collector 916. In a further embodiment, the data provider 302 may shut down according to a command received from a remote administrator. If the data provider 302 shuts down 1024, the status information 308 is updated to an "inactive state" and the method 900 ends. The data provider 302 may choose to shut down while additional data providers within the plurality of data providers 928 continue to execute various requests, such as requests to monitor additional resources. If the data provider 302 does not shut down, the data provider 302 may continue 1026 to execute the request 600 and send 1022 the results to the collector 916 until the load becomes sufficient enough that the data provider 302 chooses 1024 to shut down.

Figure 11:
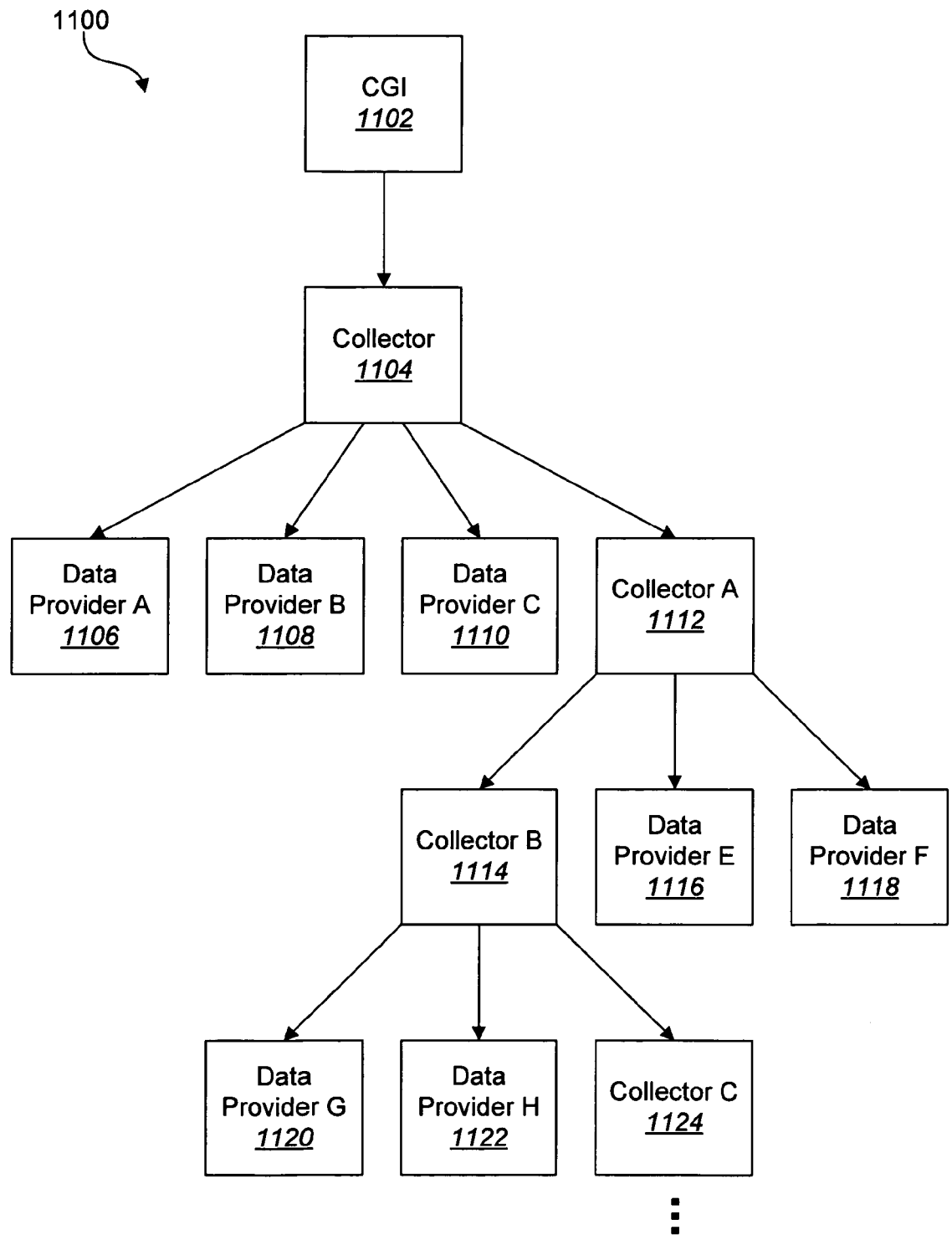
FIG. 11 illustrates one embodiment of a layered collector system.

FIG. 11 is a block diagram illustrating one embodiment of a layered collector system 1100. The layered system 1100 facilitates a collector 1104 to manage numerous data providers 1106, 1108, 1110 as previously described as well as collector A 1112 that possesses the same functionalities and capabilities as a data provider but is also capable of managing additional data providers 1116, 1118. For example, a common gateway interface 1102 communicates a request to the collector 1104. The collector 1104 stores copies of connection tables for each data provider it manages. Thus, the collector 1104 stores copies of the connection tables for data provider A 1106, data provider B 1108, and data provider C 1110. Collector A 1112 also includes a connection table 304 as discussed in FIG. 3. The collector 1104 also stores a copy of the connection table 304 relating to collector A 1112.

As previously explained, collector A 1112 possesses additional capabilities beyond the data providers 1106, 1108, 1110. For example, collector A 1112 is able to manage additional data providers, such as data provider E 1116 and data provider F 1118. Collector A 1112 is also capable of managing collector B 1114. Collector A 1112 stores copies of the connection tables 304 for collector B 1114, data provider E 1116, and data provider F 1118. As illustrated, collector B 1114 also manages additional data providers, namely data provider G 1120, data provider H 1122, and collector C 1124. Collector B 1114 also stores copies of the connection tables 304 for each data provider 1120, 1122 and collector C 1124. The collectors A 1112, B 1118, and C 1124 may be referred to as secondary collectors. In one embodiment, each additional data provider registers its corresponding connection table with the appropriate secondary collector. The layered system 1100 may continue with multiple collectors managing multiple data providers.

The various data providers illustrated in FIG. 11 are autonomous to each other in that each data provider and is unaware of the other data providers. Each data provider executes various requests independently of the other data providers. Similarly, each secondary collector is only aware of the additional data providers and collectors it manages. Further, each component in the layered system 1100 communicates across an identical interface. The common interface facilitates layering numerous components together in order to communicate with each other as depicted in FIG. 11.

Collector A 1112, collector B 1114, and collector C 1124 each store a connection table 304 with information concerning their own functionalities and capabilities as described in FIG. 3. However in this embodiment the collector 1104 does not store a connection table 304 including its own functionalities and capabilities. Because collectors A 1112, B 1114, and C 1124 include a connection table 304 including information regarding their own functionalities and capabilities, they are aware that they are not in communication with the common gateway interface 1102. As previously explained, in this embodiment the collector 1104 does not include a connection table 304 with information regarding its own functionalities and capabilities. As such, the collector 1104 is aware that it is in direct communication with the common gateway interface 1102. The collector 1104 is aware that it only needs to monitor a fixed communications port for requests from the common gateway interface 1102, while collectors A 1112, B 1114, and C 1124 are aware that they need to continue to monitor a dynamic or range of dynamic communications ports for requests.

Figure 12:
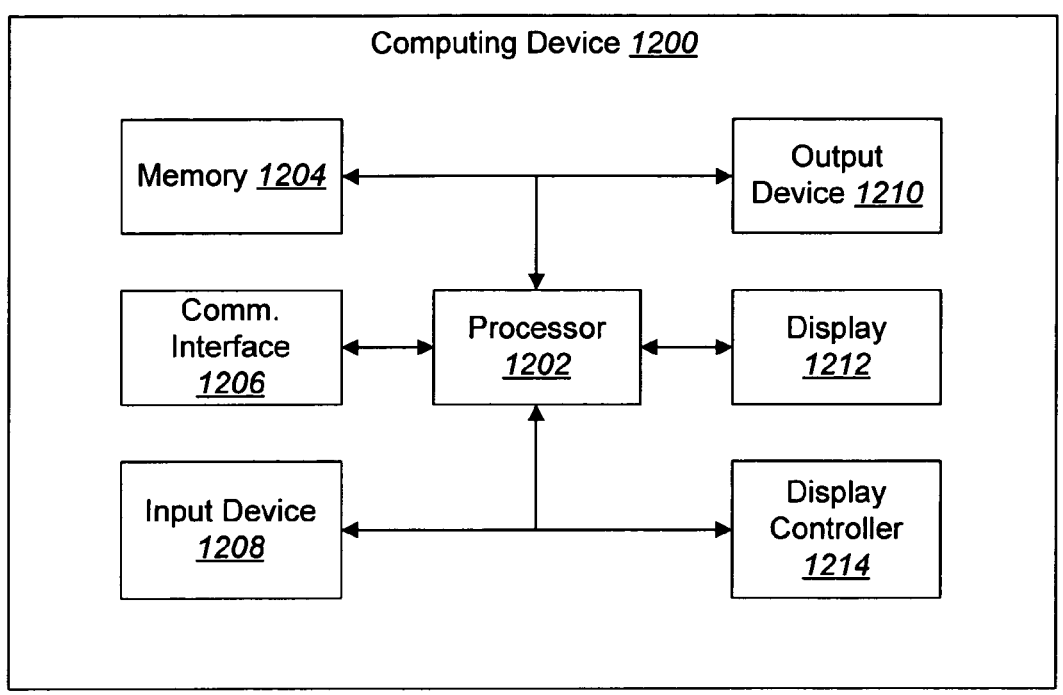
FIG. 12 is a block diagram illustrating the major hardware components typically utilized in a computer system.

FIG. 12 is a block diagram illustrating the major hardware components typically utilized in a computer system 1200. The illustrated components may be located within the same physical structure or in separate housings or structures. The components shown may also be types of resources that can be monitored by data providers in the embodiments shown herein.

The computer system 1200 includes a processor 1202 and memory 1204. The processor 1202 controls the operation of the computer system 1200 and may be embodied as a microprocessor, a microcontroller, a digital signal processor (DSP) or other device known in the art. The processor 1202 typically performs logical and arithmetic operations based on program instructions stored within the memory 1204.

As used herein, the term memory 1204 is broadly defined as any electronic component capable of storing electronic information, and may be embodied as read only memory (ROM), random access memory (RAM), magnetic disk storage media, optical storage media, flash memory devices in RAM, on-board memory included with the processor 1202, EPROM memory, EEPROM memory, registers, etc. The memory 1204 typically stores program instructions and other types of data. The program instructions may be executed by the processor 1202 to implement some or all of the methods disclosed herein.

The computer system 1200 typically also includes one or more communication interfaces 1206 for communicating with other electronic devices. The communication interfaces 1206 may be based on wired communication technology, wireless communication technology, or both. Examples of different types of communication interfaces 1206 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1200 typically also includes one or more input devices 1208 and one or more output devices 1210. Examples of different kinds of input devices 1208 include a keyboard, mouse, microphone, remote control device, button, joystick, trackball, touchpad, lightpen, etc. Examples of different kinds of output devices 1210 include a speaker, printer, etc. One specific type of output device which is typically included in a computer system is a display device 1212. Display devices 1212 used with embodiments disclosed herein may utilize any suitable image projection technology, such as a cathode ray tube (CRT), liquid crystal display (LCD), light-emitting diode (LED), gas plasma, electroluminescence, or the like. A display controller 1214 may also be provided, for converting data stored in the memory 1204 into text, graphics, and/or moving images (as appropriate) shown on the display device 1212.

Of course, FIG. 12 illustrates only one possible configuration of a computer system 1200. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for monitoring resources within a computer system comprising:

receiving a request from a computing device via a computer network requesting that at least one resource in the computer system be monitored, wherein the request is received by a collector, wherein the request includes a filename of a program that is to be executed in order to monitor the resource, a resource parameter indicating the type of resource that is requested to be monitored, and a resource parameter instance indicating the instance of the resource parameter that is requested to be monitored;

storing within the collector a copy of a connection table stored within each of a plurality of monitoring processes, the connection table for each monitoring process comprising parameter information indicating identification information, status information, types of resources that the monitoring process is capable of monitoring, and a communications port or range of communications ports that the monitoring process monitors to receive a request;

selecting, by the collector, a monitoring process from the plurality of monitoring processes that is capable of monitoring the at least one resource based upon a match between information in the received request and information within a corresponding connection table for the selected monitoring process;

forwarding the request to the selected monitoring process within the plurality of monitoring processes via a communications port listed in the corresponding connection table;

obtaining resource information from monitoring the at least one resource by the selected monitoring process;

sending the resource information obtained from monitoring the at least one resource to the computing device that sent the request;

enabling the selected monitoring process to terminate after execution of the request;

receiving at the collector an updated copy of the connection table from the selected monitoring process after receiving the resource information from the selected monitoring process; and replacing a previous version of the copy of the connection table with the received updated copy of the connection table.

2. The method of claim 1, further comprising collecting a plurality of requests in the collector.

3. The method of claim 1, further comprising communicating the request to a secondary collector within a plurality of secondary collectors.

4. The method of claim 1, further comprising monitoring a fixed communications port.

5. The method of claim 1, further comprising monitoring a plurality of dynamic communications ports.

6. The method of claim 1, further comprising:
receiving a plurality of requests; and
collecting the plurality of requests in the collector.

7. A computer system comprising:
a processor;
memory in electronic communication with the processor;
instructions stored in the memory, the instructions being executable to:
  receive a request from a computing device via a computer network requesting that at least one resource in the computer system be monitored, wherein the request is received by a collector, wherein the request includes a filename of a program that is to be executed in order to monitor the resource, a resource parameter indicating the type of resource that is requested to be monitored, and a resource parameter instance indicating the instance of the resource parameter that is requested to be monitored;
  store within the collector a copy of a connection table stored within each of a plurality of monitoring processes, the connection table for each monitoring process comprising parameter information indicating identification information, status information, types of resources that the monitoring process is capable of monitoring, and a communications port or range of communications ports that the monitoring process monitors to receive a request;
  select, by the collector, a monitoring process from the plurality of monitoring processes based upon a match between information in the received request and information within a corresponding connection table for the selected monitoring process;
  forward the request to the selected monitoring process within the plurality of monitoring processes via a communications port listed in the corresponding connection table;
  obtain resource information from monitoring the at least one resource by the selected monitoring process;
  send resource information obtained from monitoring the at least one resource to the computing device that sent the request;
  enable the selected monitoring process to terminate after execution of the request;
  receive at the collector an updated copy of the connection table from the selected monitoring process after receiving the resource information from the selected monitoring process; and
  replace a previous version of the copy of the connection table with the received updated copy of the connection table.

8. The system of claim 7, wherein the collector is further configured to collect a plurality of requests.

9. The system of claim 7, wherein the collector is further configured to send a command to terminate the selected monitoring process after execution of the request.

10. The system of claim 7, further comprising a plurality of secondary collectors configured to select the monitoring process from the plurality of monitoring processes.

11. The system of claim 7, further comprising a secure interface configured to receive the request from a client.

12. The system of claim 11, further comprising a common gateway interface configured to communicate the request from the secure interface to the collector.

13. The system of claim 7, further comprising a monitoring table configured to provide information regarding which monitoring process within the plurality of monitoring processes is monitoring a particular resource.

14. A non-transitory computer-readable medium comprising executable instructions for monitoring resources within a computer system, the instructions being executable to:
receive a plurality of requests from a computing device via a computer network requesting that at least one resource in the computer system be monitored, wherein the request includes a filename of a program that is to be executed in order to monitor the resource, a resource parameter indicating the type of resource that is requested to be monitored, and a resource parameter instance indicating the instance of the resource parameter that is requested to be monitored;
collect the plurality of requests within a collector;
store within the collector a copy of a connection table stored within each of a plurality of monitoring processes, the connection table for each monitoring process comprising parameter information indicating identification information, status information, types of resources that the monitoring process is capable of monitoring, and a communications port or ramie of communications ports that the monitoring process monitors to receive a request;
select, by the collector, a monitoring process from the plurality of monitoring processes based upon a match between information in the received request and information within a corresponding connection table for the selected monitoring process;

forward a request from the plurality of requests to the selected monitoring process within the plurality of monitoring processes via a communications port listed in the corresponding connection table;

obtain resource information from monitoring the at least one resource by the selected monitoring process;

send resource information obtained from monitoring the at least one resource to the computing device that sent the plurality of requests; and enable the selected monitoring process to terminate after execution of the request;

receive at the collector an updated copy of the connection table from the selected monitoring process after receiving the resource information from the selected monitoring process; and replace a previous version of the copy of the connection table with the received updated copy of the connection table.

* * * * *

UNITED STATES PATENT AND TRADEMARK OFFICE
CERTIFICATE OF CORRECTION

PATENT NO.        : 8,521,864 B1
APPLICATION NO.   : 11/328731
DATED             : August 27, 2013
INVENTOR(S)       : Mark R. Beazer et al.

Page 1 of 1

It is certified that error appears in the above-identified patent and that said Letters Patent is hereby corrected as shown below:

In the Claims

In column 16, line 62, claim 14 delete "or ramie" and replace it with --or range--.

Signed and Sealed this
Twenty-fourth Day of December, 2013

Margaret A. Focarino
*Commissioner for Patents of the United States Patent and Trademark Office*